US008327021B2

(12) United States Patent
Papoushado et al.

(10) Patent No.: US 8,327,021 B2
(45) Date of Patent: Dec. 4, 2012

(54) TECHNIQUE OF DETERMINING CONNECTIVITY SOLUTIONS FOR NETWORK ELEMENTS (75) Inventors: Israel Papoushado, Tel-Aviv (IL); Avraham Shemesh, Petach-Tikva (IL); Anat Yam, Givat-Shmuel (IL)

(73) Assignee: ECI Telecom Ltd, Petach Tikva (IL)

( * ) Notice: Subject to any disclaimer, the term of this patent is extended or adjusted under 35 U.S.C. 154(b) by 2146 days.

(21) Appl. No.: 10/496,664

(22) PCT Filed: Dec. 31, 2001

(86) PCT No.: PCT/IL01/01219
§ 371 (c)(1), (2), (4) Date: May 25, 2004

(87) PCT Pub. No.: WO03/056758
PCT Pub. Date: Jul. 10, 2003

(65) Prior Publication Data
US 2005/0013259 A1    Jan. 20, 2005

(51) Int. Cl.
*G06F 15/173* (2006.01)
(52) U.S. Cl. ........................................ 709/244; 709/223
(58) Field of Classification Search .................. 709/223, 709/244
See application file for complete search history.

(56) References Cited

U.S. PATENT DOCUMENTS

| | | | |
|---|---|---|---|
| 5,463,621 A * | 10/1995 | Suzuki | 370/399 |
| 5,684,967 A | 11/1997 | McKenna et al. | |
| 5,760,440 A | 6/1998 | Kitamura et al. | |
| 5,822,305 A * | 10/1998 | Vaishnavi et al. | 370/254 |
| 6,353,596 B1 * | 3/2002 | Grossglauser et al. | 370/256 |
| 6,850,997 B1 * | 2/2005 | Rooney et al. | 710/38 |
| 7,526,541 B2 * | 4/2009 | Roese et al. | 709/223 |
| 7,590,072 B2 * | 9/2009 | Radi et al. | 370/254 |
| 2003/0115361 A1 * | 6/2003 | Kirk et al. | 709/244 |

FOREIGN PATENT DOCUMENTS
EP    1 130 942 A2    9/2001
* cited by examiner

*Primary Examiner* — Douglas Blair
(74) *Attorney, Agent, or Firm* — Browdy and Neimark, PLLC (57) ABSTRACT A technique of finding connectivity solutions for network elements to be switched into a path selected in a network managed by a network management system (NMS), wherein each network element comprises input ports and output ports, each of the ports enabling a plurality of connection points, the technique including providing, at the level of NMS, a connectivity table (CT) comprising data on possible internal connections between connection points of any input port and any output port of any of the network elements managed by the NMS. The technique enables, whenever a particular network element is selected with its input port and its output port to be used in the path, obtaining a connectivity solution for the particular network element at the level of NMS.

7 Claims, 5 Drawing Sheets

TECHNIQUE OF DETERMINING CONNECTIVITY SOLUTIONS FOR NETWORK ELEMENTS

FIELD OF THE INVENTION

The invention relates to allocating connectivity solutions for network elements, using functionality of a Network Manager System controlling the elements in a telecommunication network.

BACKGROUND OF THE INVENTION

Modern telecommunication networks comprise huge numbers of network nodes (network elements), and a great number of the nodes are switching elements such as cross-connects having a complex system of input and output ports. Each of the input and output ports usually comprises a plurality of connections and is characterized by various functions. For example, some output ports may serve for dropping portions of a signal, while other output ports provide a throughput of the inputted signal. The switching elements not only comprise various types of ports and connections, but usually have particular equipment limitations so that not each and every input connector can work with an arbitrary output connector of the same or other switching element in the network. There may be a number of reasons for such limitations, including differences in protocols, physical characteristics, incompatible locations in space, preferred or non-preferred connections, cost-related limitations etc.

For solving various tasks related to finding appropriate connections in the modern networks, the following hierarchy of management systems is usually provided and utilized:
- a Network Management System (NMS) of the network, NMS having a network-wide view i.e., possessing information on types of all existing network nodes and their connections at the current moment,
- an Element Management System (EMS) of a particular network element, EMS having an element-wide view i.e., holding information on various types of connections the network element (node) comprises, and on various equipment limitations the network element has.

The NMS sees the network as a current configuration of the network nodes and may contact any node by contacting its EMS.

When a path is to be found between two points in the network, a program usually called pathfinder applies to the NMS for allocating such a path between the available network elements. Upon finding a preliminary path which, for example, is determined as a shortest path, a detailed connectivity pattern should be found via the elements planned for the path. To do that, the NMS applies to EMS of each node in the path to allocate specific connectivity solutions.

A similar method is described in EP 1130942A2, where the network manager queries a resource management mechanism to allocate an output port for an input port in an optical packet switching apparatus. The resource management mechanism then applies to a port availability database of a switching element, and upon reserving a spare output port, the optical switch control mechanism is activated.

The iterations between the NMS and each of the EMS are time consuming, require multiple exchange of protocols. Sometimes, the connectivity solution for a particular node cannot be found due to any of its equipment limitations unknown to the NMS, and a substantive portion of the pathfinder process must be repeated i.e., a number of searches, performed by the NMS in interaction with EMS, increases. As a result, the process requires more time and is inefficient.

OBJECT OF THE INVENTION

It is therefore an object of the present invention to provide such a technology for finding connectivity solutions in a network comprising a great number of switching network elements and NMS, which enables effectively performing it at the NMS level.

SUMMARY OF THE INVENTION

In order to reduce the time required for finding connectivity solutions in network elements, NMS (Network Management System) may comprise a centralized connectivity database or table formed from component connectivity databases of a plurality of the network elements. Each of the component connectivity databases can be copied from EMS (Element Management System) of the corresponding network element. In such a case, the NMS will exactly "know" the structure of each and every network element.

In the present application, the term NMS should be understood as a managing entity responsible for management of a particular group of network elements forming a network or part thereof.

In other words, the object of the invention can be achieved by providing a method of finding connectivity solutions for network elements to be switched into a path selected in a network managed by a network management system (NMS), wherein each network element comprises input ports and output ports, each of the ports enabling a plurality of connection points, the method including providing, at the level of NMS, a connectivity table (CT) comprising data on possible internal connections between connection points of any input port and any output port of any of the network elements managed by said NMS, thereby enabling, whenever a particular network element is selected with its input port and its output port to be used in the path, obtaining a connectivity solution for said particular network element at the level of NMS.

The method also comprises continuous updating the NMS by the EMS of the respective managed network elements concerning any changes in the component connectivity tables, for example, concerning availability of particular connection points.

However, to reduce the memory required for storing such a table in NMS, the object of the invention can be achieved without "knowing" each particular network element by the NMS, by performing the following steps:
- classifying connection points of both the input ports and the output ports of all network elements into a number of connection groups marked 1, 2, 3 ... n, wherein each of the groups is characterized by similar properties and/or limitations
- assigning one or more of said connection groups to each input port and each output port of a particular network element,
- forming the connectivity table to represent common connectivity rules stating possibility of creating connection between any arbitrary connection group of the 1, 2, 3 ... n belonging to an input port of a network element and any arbitrary connection group of the 1, 2, 3 ... n belonging to an output port of the network element, thereby enabling, whenever a particular network element is selected with its input port and its output port to be used in the path, obtaining a connectivity solution for said particular network element at the level of NMS, by applying the connectivity rules to the connection groups assigned to the selected input and output ports.

It goes without saying that the above method is universal for any of the network elements managed by the NMS.

According to the preferred version of the method, it comprises arranging the connectivity table (CT) so that rows of the table being the connection groups 1, 2, . . . n of the input ports, columns of the table are the connection groups 1, 2, . . . n of the output ports, and each intersection cell between a particular row and a specific column comprises information about a possibility of creating an internal connection between a connection point belonging to said particular group of the input ports and a connection point belonging to said specific group of the output ports.

It should be emphasized that, in the preferred version of the present invention, the NMS does not have to know (store) the connectivity structure of each and every network element (NE). Instead, it stores a single and relatively small connectivity table (CT) which is built to reflect common connectivity rules in the network elements and thus effectively assists in finding real connectivity solutions. Some additional information might be held in the NMS, which will be mentioned later on.

According to a further, more elaborated version of the method, the method comprises:
  applying to the NMS, by indicating a particular network element with its input port and its output port required for the selected path, to find a connectivity solution for said network element,
  checking in NMS which connection groups of said 1, 2, . . . n are present in said input port, and which—in said output port,
  applying the connectivity rules by using said connectivity table (CT) at the NMS to define, whether the desired connection can be accomplished between at least one group of the input port's connection groups and at least one group of the output port's connection groups;
  if in the affirmative, considering the connectivity solution to be found and
  applying from the NMS to an Element Management System (EMS) of the particular network element to activate a specific internal connection in the element,
  if in the negative, issuing a message from the NMS that no connectivity solution is found for the indicated said input port and said output port of the NE.

The selection of the NE with its ports for a path can be performed, say, by a Pathfinder program forming part of the NMS. If no connectivity solution is found for the NE selected by the Pathfinder, it should be accordingly informed.

The above version of the method demonstrates that only the lower level operation (activation of the internal connection) is performed at the network element level, and there are practically no iterations from the element (EMS) level to the NMS level. Would the principal solution on the connectivity between an input port and an output port of a particular network element (NE) be taken at the level of NE, there would be many iterative communications between EMS and NMS.

The task of finding connectivity solutions for network elements can be almost completely resolved at the level of NMS, so that only activation of the internal connection is left to the level of EMS, due to the fact that at the level of NMS, there is already all information concerning connection groups associated to each particular port in each NE, and all the information on possible connectivity between any of the "input" connection groups and any of the "output" connection groups.

The method, in particular the step of applying the connectivity rules, may further comprise a step of pointing out, at the level of NMS, an internal connection between a contact point from the input connection group and a contact point from the output connection group, wherein said input connection group and said output connection group are selected at the level of NMS for a particular network element as a connectivity solution.

The search for a connectivity solution (either using the CT composed from the component connectivity tables, or using the CT of common connectivity rules) may be terminated by checking information on busy connections. In particular, it can be made by preliminary providing and further referring to a data base of busy connections (or a so-called hash table HT) in the NMS, indicating internal connections which are presently occupied in the network elements. The HT is composed of a plurality of Hash sub-tables assigned to respective network elements. Each of the Hash sub-tables comprises only a list of busy internal connections of the element, and therefore is economical from the point of memory since there is no need in storing status of all possible real connections which might be arranged in the NE between all its input and output connection points.

When using the CT of common connectivity rules, the step of checking information on busy connections may comprise preliminary providing and further referring to a data base for docketing a number of existing connection points in each connection group of a particular element; the pointing out being effected upon comparing information about existing connection points in the selected input and output connection groups with the information on busy connections.

To explain the method in more detail, some information should be given on how the NMS is organized. From the request pointing out a particular selected network element, the NMS obtains indications on the element's input and output ports. For this purpose, any NMS holds its topological information, preferably in the form of a network graph. As has been mentioned before, the NMS comprises the Connectivity Table (CT) enabling to decide whether the selected ports are capable of creating an internal connection there-between. The Connectivity Table (CT) can be built from component connectivity tables of the managed network elements. If so, the CT "knows" all limitations of the connectivity points of these network elements and enables to find a connectivity solution at the level of the NMS.

According to the preferred embodiment of the invention, the topologic information additionally describes which connection groups are present in which ports, concerning any of the network elements managed by the NMS. Optionally, the topological information may comprise docketing of existing connection points in each connection group of any port of a managed network element. Though this information is quite detailed, it is still far from the complete information on the network elements' internal structure as in some of the prior art solutions. The Connectivity Table (CT) of the NMS reflects common connectivity rules enabling to decide whether the selected ports (by virtue of the connection groups they comprise) are capable of creating an internal connection therebetween. Actually, such a Connectivity Table takes into account and generalizes all limitations of the connectivity points, known to the managed network elements.

Based on the above, and according to another aspect of the invention, there is provided an improved network management system (NMS) comprising a Connectivity Handler (CH) block enabling finding, at the level of NMS, connectivity solutions for a particular network element to be switched in a path selected over a network managed by the NMS, wherein the Connectivity Handler comprising a connectivity table (CT) holding data on possible internal connections within any of the network elements managed by said NMS.

In one embodiment, the CT is composed from connectivity databases obtained from EMS of respective network elements.

According to a preferred embodiment of the said NMS, the NMS comprises:
modified topologic data concerning the network elements of said network and their ports, wherein to each input port and to each output port of any network element there are respectively assigned one or more connection groups 1, 2, ... n of connection points such that each connection group is characterized by similar features and/or limitations, and
the CT comprises:
common connectivity rules stating possibility of creating connection between any arbitrary connection group of the 1, 2, 3 ... n belonging to an input port of a network element and any arbitrary connection group of the 1, 2, 3 ... n belonging to an output port of the network element,
the CT thereby enabling NMS, upon obtaining a request indicating a particular network element with a pair of desired input and output ports to be used in a selected path, to determine whether there is a connectivity solution in said network element.

The connectivity table (CT) is preferably arranged so that rows of the table are the connection groups 1, 2, ... n belonging to input ports, and columns of the table are the connection groups 1, 2, ... n belonging to output ports, and each intersection cell between a particular row and a specific column comprising information concerning a possibility of creating an internal connection between at least one connection point from the connection group belonging to an input port of a network element, and at least one connection point from the connection group belonging to an output port of said network element.

Optionally, the Connectivity Handler in the NMS may comprise a busy connections database (a so-called hash table) in the form of information strings, each indicating internal connections which are currently busy in a particular network element of the network. Each string is intended for one busy connection, wherein the strings belonging to one network element forming a hash-sub-table of that element.

In case the CT is built for groups of contact points, the modified topological data may optionally comprise a data base for docketing a number of existing connection points in each connection group of each port of each particular element. To point out a real connection, the CH should then be capable of comparing information about existing connection points in the selected input and output connection groups with the information on busy connections.

In accordance with a third aspect of the invention, there is also provided a computer program product directly loadable into the internal memory of a digital computer, comprising software code portions for performing the steps of the above-described method when said product is run on the computer.

The computer program product, stored on a computer usable medium, comprises computer readable program means for causing a computer to control execution of functions of the Network Management System as described above.

BRIEF DESCRIPTION OF THE DRAWINGS

The invention can further be described and illustrated with the aid of the following non-limiting drawings, in which.

DETAILED DESCRIPTION OF EXEMPLARY EMBODIMENTS

Figure 1:
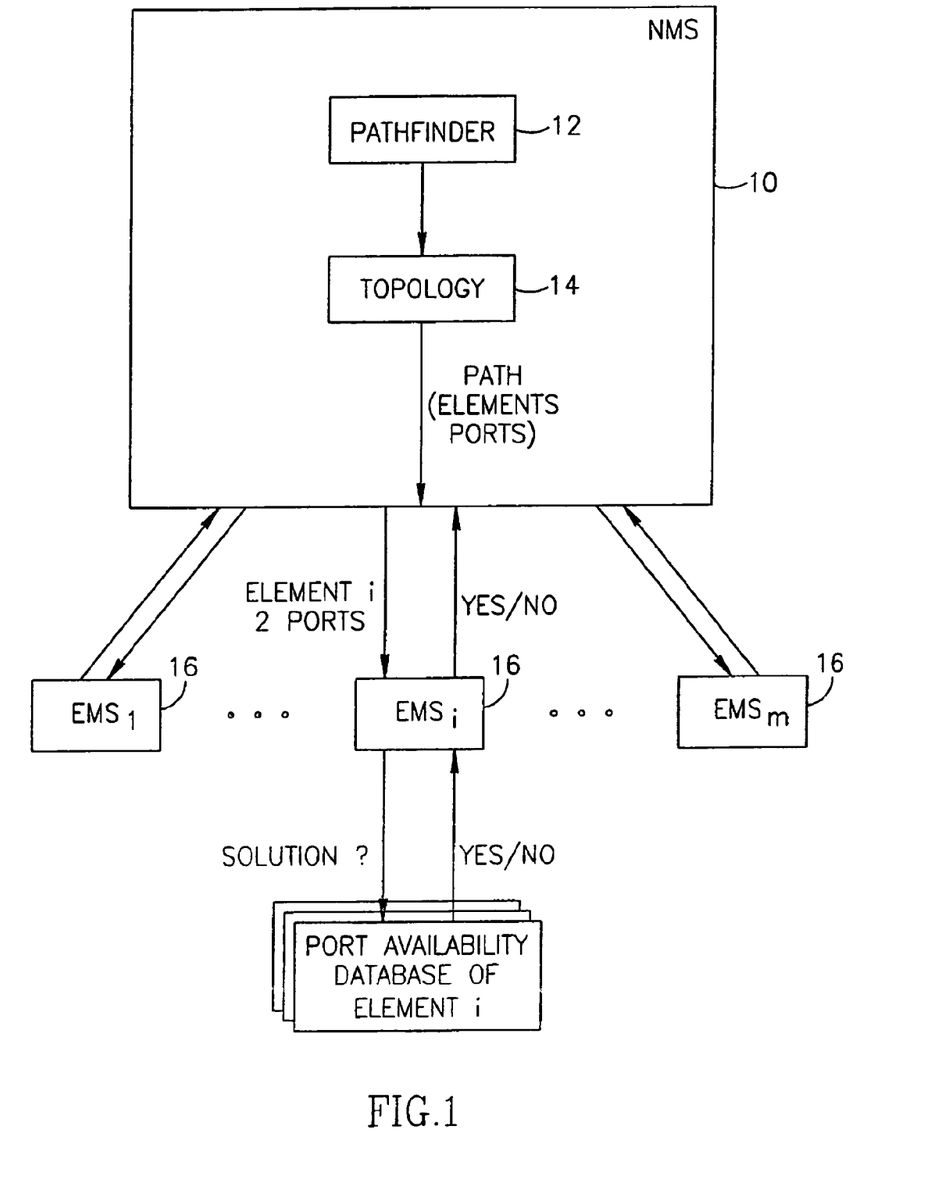
FIG. 1 (prior art) is a known structural block diagram illustrating interaction between NMS and EMS in the task of finding connectivity solutions.

FIG. 1 illustrates a known type of interaction between NMS and EMS for finding a connectivity solution in a network element selected to form part of a path in a network (not shown). NMS (Network Management System) is marked 10 and comprises a pathfinder program (marked 12) and data on the network topology (marked 14), which is usually built as a graph reflecting the existing network elements, ports and arrangement of the elements in the network. The pathfinder's function is to select a path in the network according to a number of conditions and based on the network topology, and to form in the NMS a request indicating particular network elements and ports thereof which are to be utilized (i.e., the selected input port and the selected output port). The information on the selected ports are then transmitted from the NMS to EMS (Element Management System) of each element selected for the path (the EMS blocks: 1, i ... n are marked with 16). The EMS of a particular network element looks for an internal connection between the selected input port and the selected output port using information 18 available in the ports and based on specific limitations known to the EMS. The limitations can be as follows: the selected ports may be available or not, connection points in the selected ports may be available or not, some available connection points may be prevented from using for the required type of connection, etc. The limitations and physical availability of connections can be reflected in a so-called port availability data associated with a particular port, and there are as many of such data(bases) in the EMS, as the number of ports in the element. After clearing up all availability questions, the relevant EMS will report to the NMS whether the connectivity solution is found. Interaction between the NMS and EMS may include multiple steps and is therefore time consuming. The path finding process is complex and long; when during the process there are stops for inquiring EMS, such interrups/interactions become time consuming.

Figure 2:
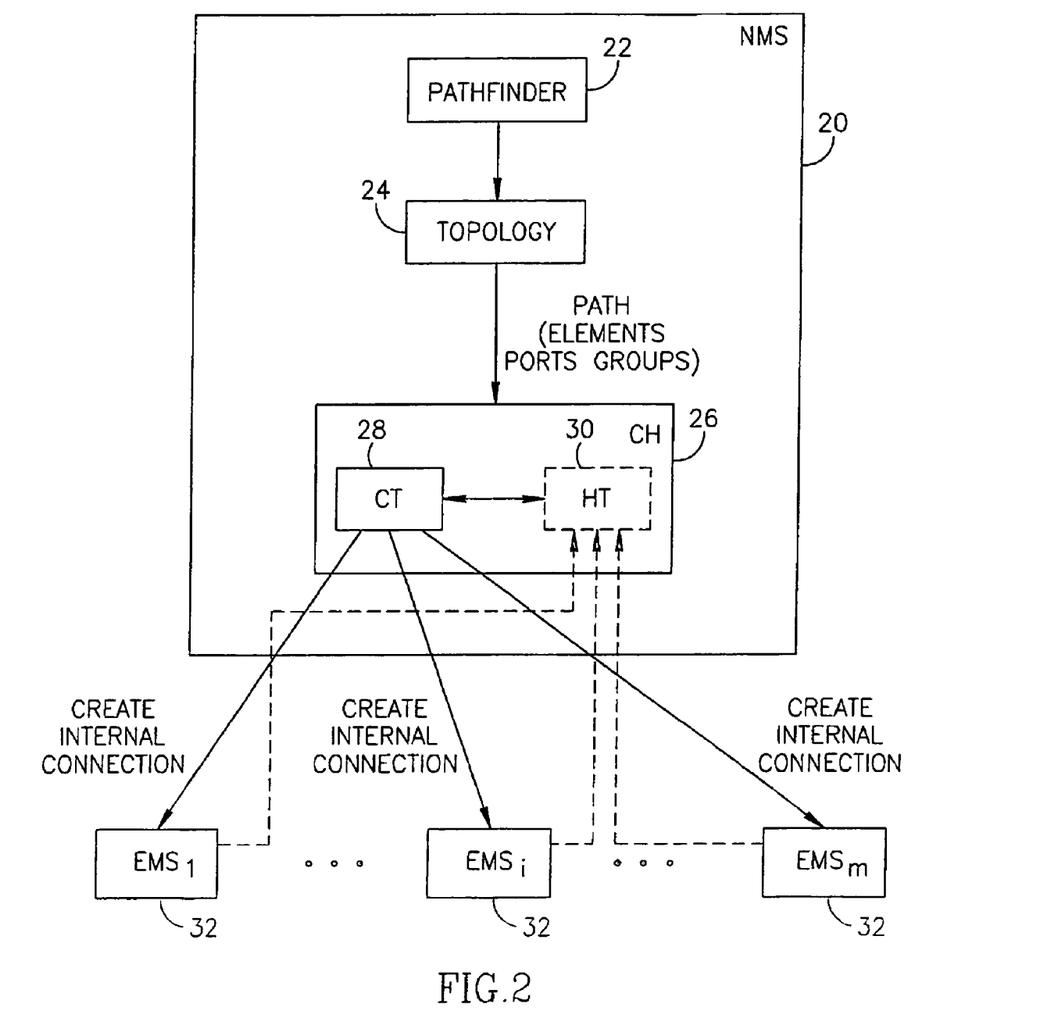
FIG. 2 is a structural block diagram illustrating interaction between NMS and EMS for finding connectivity solutions, according to one embodiment of the invention.

FIG. 2 illustrates a diagram reflecting interaction between a modified NMS and a number of EMSs according to one embodiment of the proposed invention. The modified NMS comprises a Connectivity Handler (CH) with a Connectivity Table (CT) which, in general, may be composed from connectivity tables of all respective EMSs in order to make connectivity decisions at the level of NMS. Dynamic update of the Connectivity Handler on limitations at the elements, for example—on changes in status of the connection ports/points can be provided and is marked by dotted lines.

Preferably, all connection points existing in the ports of network elements (see also FIG. 3) managed by the NMS, are classified into connection groups. Each of the groups is characterized by specific properties and limitations. By doing that, a huge plurality of connection points of all the network elements are divided into a relatively small number of groups, each having a known behavior. The NMS 20 comprises a pathfinder 22, a modified topology data 24 which additionally holds information about specific connection groups which exist in (or are assigned to) each of the ports of the network elements.

The modified NMS further comprises a new connectivity handler (CH) block 26 which comprises a connectivity table (CT) 28. One preferred example of the connectivity table is shown below in FIG. 4. The connectivity table 28 actually stores so-called common connectivity rules which, in order to formulate (at the level of NMS), whether and how the ports selected by the pathfinder can be interconnected, introduce terms of compatibility/incompatibility between connection groups of input and output ports. Since the connection groups of the connection points are formed over all the network, these terms of compatibility will apply to any network element having ports comprising any of such groups.

The connectivity table CT (28) of the CH block (26), upon receiving information on connection groups existing in the selected ports of the element pointed out for a path, is capable of giving answers which connections are possible. This information may be forwarded to a corresponding EMS 32 for selecting a real internal connection and activating it. However, to minimize a chance that the desired connection will be busy, the NMS may apply to the EMS level only upon consulting with an optional block 30 of the connectivity handler 26. This block is called a hash table (HT) and registers only busy connections of each network element; it is continuously updated by the EMS 1, . . . m. When a possible connection is allowed by CT and checked with the HT, an internal connection may actually be pointed out and transferred for activation to a corresponding EMS 32.

Figure 3:
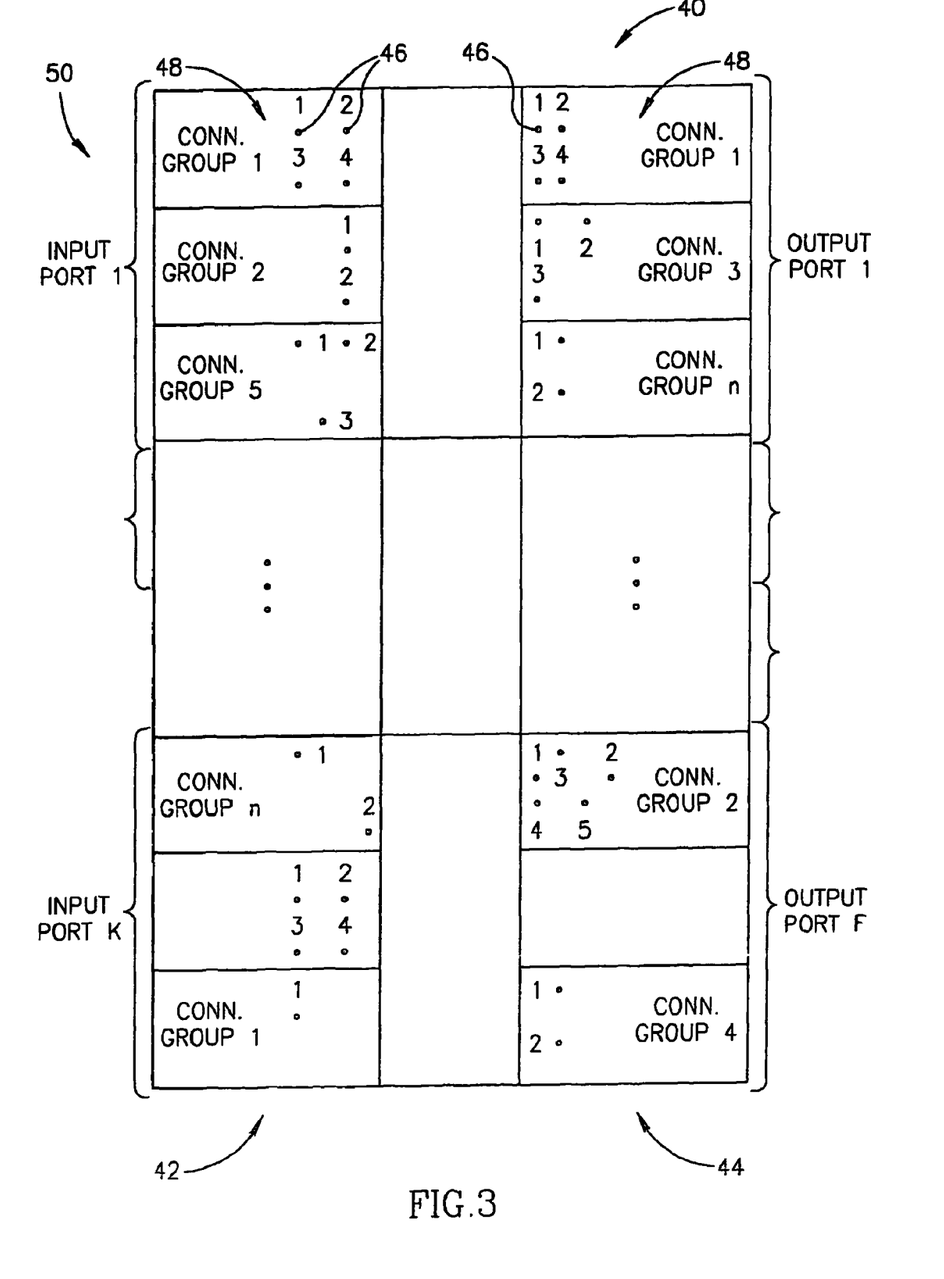
FIG. 3 is a schematic illustration of an exemplary network element having input and output ports, each port comprising a plurality of connection groups according to the classification proposed in the invention.

FIG. 3 illustrates a network element 40 having a plurality of input ports 42 (1, . . . K) and a plurality of output ports 44 (1, . . . F). Each of the ports comprises connection points illustrated as circles and marked 46. All the connection points existing in the network elements, managed by the inventive NMS, are schematically divided into a number of connection groups 1, 2, . . . n. Each of the groups is characterized by its particular limitations and behavior (properties, features) of the connection points.

For example, connection points of a specific group positioned at input ports can be connected only to connection points of this same group positioned at output ports. In one case, connection points at an input port can be intended for entering, into the network element such as cross-connect, virtual containers carrying data according to the SDH/SONET data transmission hierarchy. In such a case, the connection point can be called a VC point. In SDH switching equipment, the VC points are usually intended for inputting/outputting VC-4 data streams.

Each port comprises connection points 46 belonging to one or more groups 48. For example, the Input Port 1 (marked 50) comprises connection points 46 belonging to three connection groups 48, namely to connection groups 1, 2 and 5. Each of the connection points within one group has its serial number or other indication.

Figure 4:
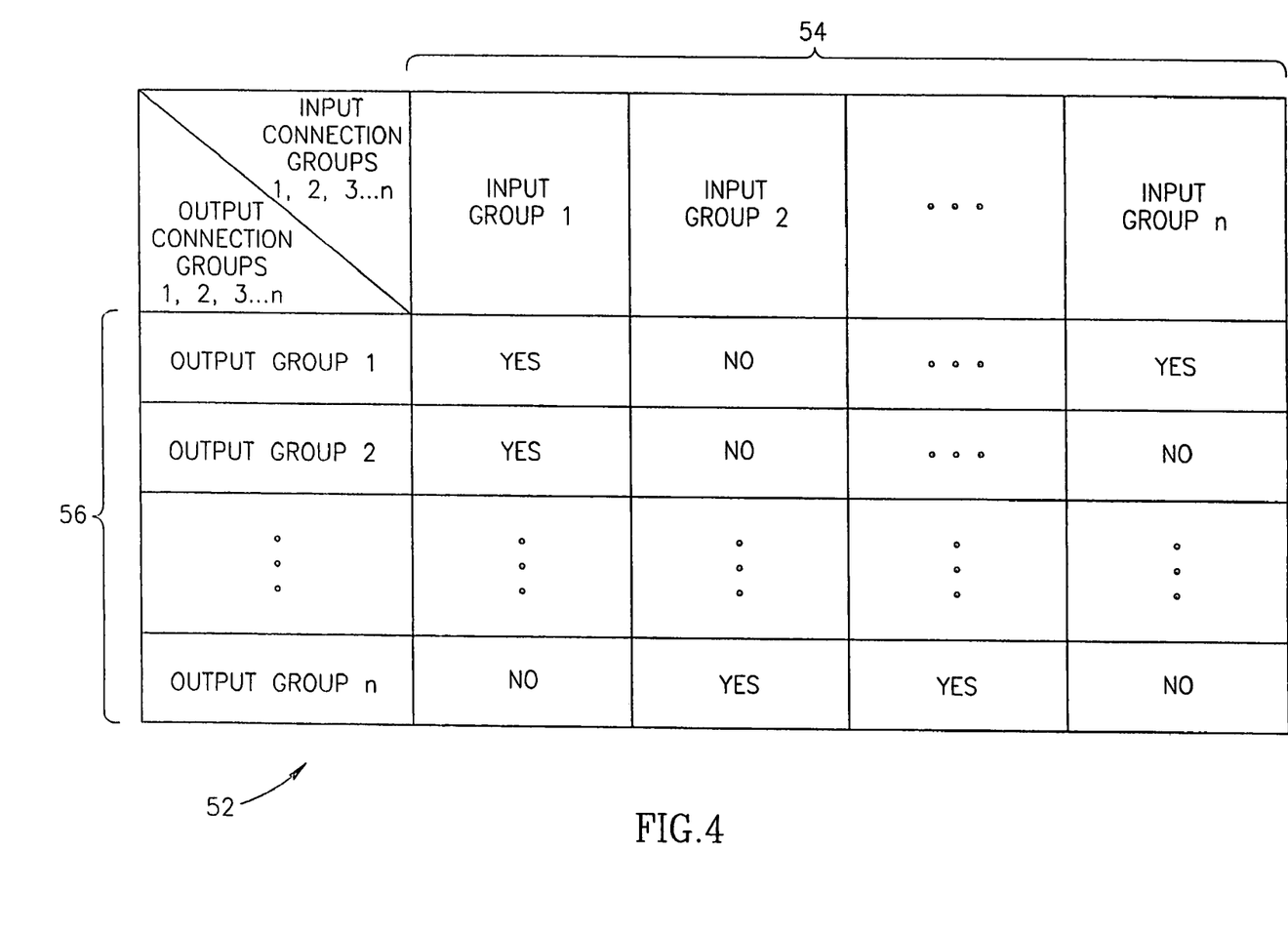
FIG. 4 is an example of an NMS connectivity table (CT) according to the invention.

FIG. 4 illustrates an example of the preferred embodiment of a connectivity table (CT) 52, which comprises n columns 54 and n rows 56, where each of the rows is assigned to a particular connection group of input ports or simply to "input connection groups", and each of the columns is assigned to a particular "output connection group". Symbols in the intersection of a particular row and a specific column have the meaning that an internal connection between the particular input connection group and the specific output connection group is either impossible or possible with or without some conditions.

Figure 5:
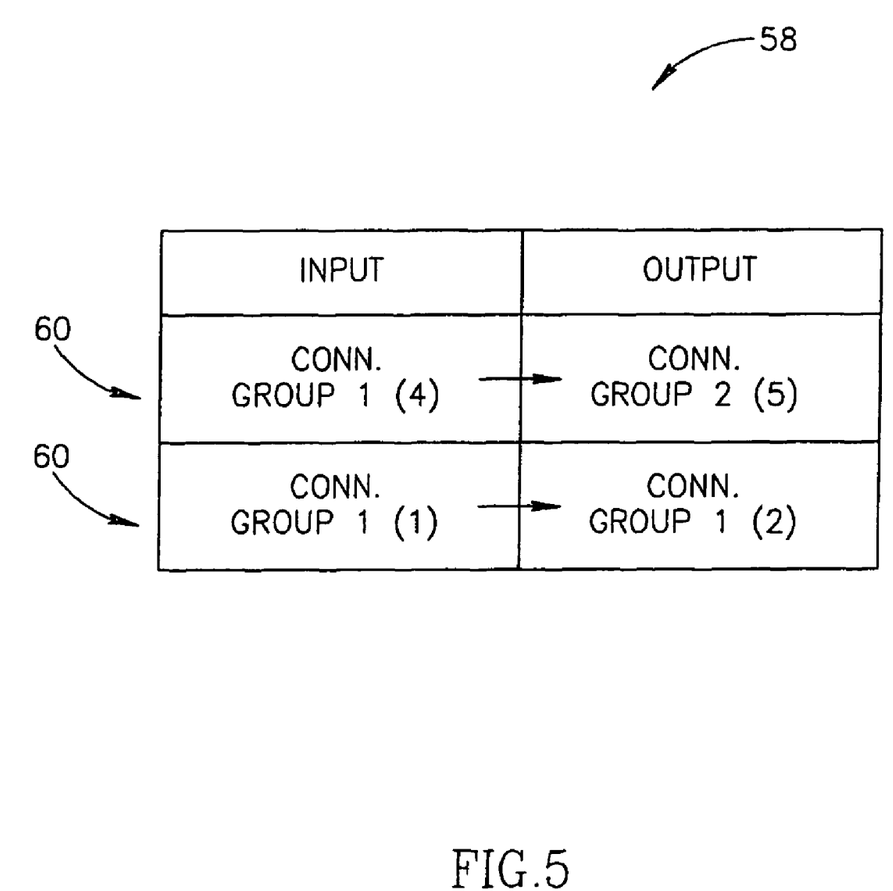
FIG. 5 is an example of a hash table (HT) in NMS.

FIG. 5 illustrates a fragment of a data base of busy connections or a so-called hush sub-table 58 for a particular network element. The table does not have any standardized volume and comprises only strings 60 which announce on currently busy connections in the network elements. The table is used as follows: upon finding a possible connectivity solution, say, between the input connection group 1 and the output connection group 2, NMS checks the hash sub-table of the element of interest to point out particular connection points to the EMS. Since the connection points 4 and 1 of the input connection group 1 are already busy, they will not be pointed out in the order. Also, connection point 5 of the output connection group 2 cannot be pointed out. It is assumed, that other connection points exist in the selected groups of the respective input and output ports of the required element, and they will be approved by EMS. However, the table will not be helpful if there is no extra connection points in the relevant groups, except for those already occupied. In this case, a negative response will be received from the EMS and, in this special case iterations will occur between the NMS and EMS.

To avoid such a situation, the modified topology data may optionally comprise information on the total number of input contact points (output contact points) of each group in an input (output) port. This information would be compared with the information on busy connections in the hush-table to know exactly whether there is at least one available combination, and based on that comparison would produce a specified connectivity order to the EMS if the answer is positive, or prevent applying to the EMS if the answer is negative.

While the present invention has been described using on a number of specific examples, one should appreciate that one might propose other implementations of a Network Management System capable of finding connectivity solutions for its managed network elements at the level of NMS by creating and using common connectivity rules, and modified methods of using such NMS, though all these implementations/methods are to be considered part of the inventive concept.

The invention claimed is:

1. A method of finding connectivity solutions for network elements to be switched into a path in a network managed by a network management system NMS, wherein each network element comprises input ports and output ports, each of the ports enabling a plurality of connection points; the method comprising
   providing a network management system (NMS) in a centralized location in the network, wherein the network further comprises said network elements,
   providing, in the NMS, a connectivity table CT comprising data on possible internal connections between various types of connection points of any input port and various types of connection points of any output port in any network element managed by said NMS,
   selecting, in the network management system NMS, a path in the network managed by the NMS,
   selecting, in the NMS, a connectivity solution for a particular network element based on the data comprised in the CT, whenever said particular network element, with its input port and its output port, is selected to be used in the path.

2. A method according to claim 1, comprising steps of:
   classifying connection points of both the input ports and the output ports of all network elements into a plurality of different connection groups symbolically marked 1, 2, 3 ... n, wherein each of the groups is characterized by similar properties and/or limitations of its connection points;

assigning to each input port and each output port of a particular network element one or more of said connection groups, forming the connectivity table to present common connectivity rules stating possibility of creating connection between any arbitrary connection group of the connection groups assigned to an input port of a network element and any arbitrary connection group of the connection groups assigned to an output port of the network element, thereby enabling obtaining a connectivity solution for said particular network element at the level of NMS by applying the connectivity rules to the connection groups assigned to the input port and the output port of said particular network element selected to be used in the path.

3. The method according to claim 2, wherein the step of forming the connectivity table CT comprises arranging the table so that rows of the table being the connection groups 1, 2, 3, ... n of the input ports, columns of the table are the connection groups 1, 2, 3, ... n of the output ports, and each intersection cell between a particular row and a specific column comprises information about a possibility of creating an internal connection between a connection point belonging to a particular group of the input ports and a connection point belonging to a specific group of the output ports.

4. The method according to claim 2, comprising steps of applying to the NMS, by indicating a particular network element with its input port and its output port required for the selected path, to find a connectivity solution for said network element, determining which connection groups of said 1, 2, 3, ... n are present in said input port, and which—in said output port, applying the connectivity rules by using said connectivity table CT at the NMS to define, whether the desired connection can be accomplished between at least one group of the input port's connection groups and at least one group of the output port's connection groups;

if the connectivity rules allows, considering the connectivity solution to be found and applying from the NMS to an Element Management System EMS of the particular network element to activate a specific internal connection in said network element, if the connectivity rules do not allow, issuing a message from the NMS that no connectivity solution is found for the indicated said input port and said output port of said network element.

5. The method according to claim 2, further comprising a step of pointing out, at the level of NMS, in the NMS, an internal connection between a contact point from an input connection group and a contact point from an output connection group, wherein said input connection group and said output connection group are selected at the level of NMS as a connectivity solution for said particular network element.

6. The method according to claim 2, further comprising a step of checking information on busy connections by preliminary providing and further referring to a data base of busy connections in the NMS, said data base indicating internal connections which are presently occupied in the network elements.

7. The method according to claim 5, comprising using the CT reflecting said common connectivity rules, and also comprising preliminary providing and further referring to a data base for docketing a number of existing connection points in each connection group of each port of a particular element; the pointing out being effected upon comparing information about existing connection points in the selected input and output connection groups with information on busy connections.

* * * * *